(12) United States Patent
Driscoll et al.

(10) Patent No.: US 10,601,130 B2
(45) Date of Patent: Mar. 24, 2020

(54) FAST BEAM PATTERNS

(71) Applicant: Echodyne Corp., Kirkland, WA (US)

(72) Inventors: Tom Driscoll, Bellevue, WA (US); William F. Graves, Jr., Kirkland, WA (US); John Desmond Hunt, Seattle, WA (US); Nathan Ingle Landy, Seattle, WA (US); Christopher L. Lambrecht, Bothell, WA (US); Milton Perque, Kirkland, WA (US); Robert Tilman Worl, Issaquah, WA (US)

(73) Assignee: Echodyne Corp., Kirkland, WA (US)

( * ) Notice: Subject to any disclaimer, the term of this patent is extended or adjusted under 35 U.S.C. 154(b) by 180 days.

(21) Appl. No.: 15/655,505

(22) Filed: Jul. 20, 2017

(65) Prior Publication Data

US 2018/0026365 A1    Jan. 25, 2018

Related U.S. Application Data

(60) Provisional application No. 62/365,288, filed on Jul. 21, 2016.

(51) Int. Cl.
  *H01Q 3/24* (2006.01)
  *H01Q 25/00* (2006.01)
  (Continued)

(52) U.S. Cl.
  CPC ............. *H01Q 3/24* (2013.01); *G01S 7/2813* (2013.01); *G01S 13/4463* (2013.01); *H01Q 3/26* (2013.01);
  (Continued)

(58) Field of Classification Search
  CPC ..... G01S 7/2813; G01S 13/4463; H01Q 3/24; H01Q 3/26; H01Q 9/0442; H01Q 21/06; H01Q 25/007
  (Continued)

(56) References Cited

U.S. PATENT DOCUMENTS 2,981,949 A   4/1961  Elliott
3,987,454 A  10/1976  Epis
(Continued)

FOREIGN PATENT DOCUMENTS

WO    2018035123 A1    2/2018

OTHER PUBLICATIONS

International Searching Authority, "International Search Report from PCT Application No. PCT/US2017/043110 filed Jul. 20, 2017", "from Foreign Counterpart of U.S. Appl. No. 15/655,505", dated Nov. 2, 2017, pp. 1-15, Published in WO.
(Continued)

*Primary Examiner* — Dao L Phan
(74) *Attorney, Agent, or Firm* — Fogg & Powers LLC (57) ABSTRACT

An embodiment of an antenna comprises an array of antenna elements arranged in groups of antenna elements adjustably coupled to respective reference waves. A multiplicity of patterns of antenna coupling settings are defined, each of which gives rise to a main lobe which points the antenna in a particular direction, each pattern also giving rise to respective side lobes. First and second such patterns may point the antenna in the same direction but with non-identical side lobes. In this way the clutter level from the side lobes relative to the main lobe is much smaller than would be the case if one of the patterns were employed both for transmitting and receiving. Alternatively, the first and second patterns may be used in quick succession both for transmitting, or used in quick succession both for receiving. The antenna may also switch rapidly between patterns where the main lobe points in a different direction in each pattern, allowing dithering of the beam or rapid switching between scanning and tracking.

24 Claims, 2 Drawing Sheets

(51) Int. Cl.
*H01Q 3/26* (2006.01)
*G01S 13/44* (2006.01)
*G01S 7/28* (2006.01)
*H01Q 21/00* (2006.01)
*H01Q 9/04* (2006.01)
*H01Q 21/06* (2006.01)

(52) U.S. Cl.
CPC ......... *H01Q 25/007* (2013.01); *H01Q 9/0442* (2013.01); *H01Q 21/005* (2013.01); *H01Q 21/065* (2013.01)

(58) Field of Classification Search
USPC .......................................................... 342/379
See application file for complete search history.

(56) References Cited

U.S. PATENT DOCUMENTS

| | | | |
|---|---|---|---|
| 4,870,424 | A | 9/1989 | Lalezari et al. |
| 5,736,907 | A | 4/1998 | Chen et al. |
| 5,781,157 | A | 7/1998 | Laird |
| 6,751,442 | B1 | 6/2004 | Barrett |
| 7,081,851 | B1 | 7/2006 | Lewis |
| 9,385,435 | B2 | 7/2016 | Bily et al. |
| 9,450,310 | B2 | 9/2016 | Bily et al. |
| 9,853,361 | B2 | 12/2017 | Chen et al. |
| 2005/0122255 | A1 | 6/2005 | Shmuel |
| 2006/0114155 | A1 | 6/2006 | Numminen |
| 2006/0132374 | A1 | 6/2006 | Wang |
| 2011/0063158 | A1 | 3/2011 | Kondou |
| 2012/0194399 | A1 | 8/2012 | Bily et al. |
| 2014/0266946 | A1 | 9/2014 | Bily et al. |
| 2015/0109178 | A1 | 4/2015 | Hyde et al. |
| 2015/0214615 | A1 | 7/2015 | Patel et al. |
| 2015/0288063 | A1 | 10/2015 | Johnson et al. |
| 2015/0318618 | A1 | 11/2015 | Chen et al. |
| 2016/0011307 | A1 | 1/2016 | Casse et al. |
| 2016/0099500 | A1 | 4/2016 | Kundtz et al. |
| 2018/0054004 | A1 | 2/2018 | Driscoll et al. |

OTHER PUBLICATIONS

U.S. Patent and Trademark Office, "Notice of Allowance", U.S. Appl. No. 15/240,980, dated Apr. 9, 2019, pp. 1-13, Published: US.

Driscoll et al., "Antenna Having Increased Side-Lobe Suppression and Improved Side-Lobe Level", "U.S. Appl. No. 15/240,980, filed Aug. 18, 2016", filed Aug. 18, 2016, pp. 1-68, Published in: US.

U.S. Patent and Trademark Office, "Office Action", U.S. Appl. No. 15/240,980, filed Oct. 4, 2018, pp. 1-16, Published: US.

Huang et al, "Chapter 11, Design and Modeling of Micorstrip Line to Substrate Integrated Waveguide Transitions", "Passive Micowave Components and Antennas", "retrieved on Feb. 5, 2017 from: http://www.intechopen.com/books/passive-microwavecomponents-and-antennas/design-and-modeling-of-microstrip-line-to-substrate-integrated-waveguidetransitions", dated Apr. 1, 2010, pp. 225-246 and reference, Publisher: INTECH.

International Searching Authority, International Search Report and Written Opinion from PCT Application No. PCT/US2017/046943 dated Oct. 26, 2017, From PCT Counterpart of U.S. Appl. No. 15/240,980, pp. 1-20, WO.

International Bureau, "International Preliminary Report on Patentability from PCT Application No. PCT/US2017/043110 dated Jan. 31, 2019", from Foreign Counterpart to U.S. Appl. No. 15/655,505, filed Jan. 31, 2019, pp. 1-10, Published: WO.

International Bureau, "International Preliminary Report on Patentability from PCT Application No. PCT/US2017/046943 dated Feb. 28, 2019", from Foreign Counterpart to U.S. Appl. No. 15/240,980, filed Feb. 28, 2019, pp. 1-14, Published: WO.

FAST BEAM PATTERNS

PRIORITY CLAIM

This application claims benefit of U.S. Provisional Patent Application No. 62/365,288, filed on Jul. 21, 2016, entitled "FAST BEAM PATTERNS", the disclosure of which is incorporated herein in its entirety.

BACKGROUND

It has not been easy to make high-gain antennas that can re-aim themselves in just tens of nanoseconds.

Over a century ago, antenna designers devised methods to create high-gain antennas. A typical class of high-gain antenna might employ a parabolic reflector. In this class of antenna, an RF feed point would be located at the focus of the parabola, pointed toward the reflector. The size of the reflector would then be proportional to the effective size of the antenna, resulting in higher gain.

Re-aiming such an antenna from one point in the sky to a different point in the sky would require physically re-aiming the antenna. Several factors impose limits on how quickly such a re-aiming could be carried out. A first factor, relating to the rotational moment of the antenna, is the available torque in the servomotors that rotate the antenna. A second factor is that even if the servomotors are arbitrarily strong, the antenna might not be strong enough to resist deformation when accelerated. It can take hundreds of milliseconds or even longer than a second to re-aim a parabolic reflector antenna from one point in the sky to a different point in the sky.

Some decades ago, Electronically Scanned Antennas (ESAs) were developed. With an ESA, many individual antenna elements are fed through some means of delaying the electrical signal to each, typically through the use of a phase shifter (as in a phased-array antenna). Each antenna element is fed through a respective phase shifter, which is programmable to inject a desired amount of delay (typically discretized into several bits per phase shifter). The task of aiming such an antenna includes sending control signals to the phase shifters to configure the intended delay per element.

For transmission, an RF signal is injected into the common port of the phased array antenna and then divided up and propagated to the elemental phase shifters. Each phase shifter propagates the signal to its respective antenna element after applying its commanded phase shift to the signal. By design, the energy radiated by each antenna element adds in free space to yield a focused beam in a particular direction. In a similar way, such an antenna can serve as a receive antenna with gain in a particular direction.

As compared with a parabolic reflector antenna, a phased-array antenna offers the benefit of being able to re-aim the beam just by reconfiguring the phase shifters and without a need to physically re-aim the antenna. The phased-array antenna has a drawback of cost and complexity due to the presence of hundreds or thousands of phase shifters (typically one per each antenna element in the array). Each phase shifter itself also takes up some physical volume and this entails that the antenna will have some bulk. Additionally, the inherent losses of phase shifters typically require that additional signal amplification is provided at each element further increasing the complexity, power draw, and thermal-management requirements.

The time required to re-aim such an antenna might be on the order of 100 nanoseconds (ns) to one microsecond (μs) or longer.

With a single-beam high-gain antenna, by definition at a time when the antenna is pointed in some particular direction, the antenna is not available to be pointed in any other particular direction. It will often be desired that an antenna will scan with two degrees of freedom to look for points of interest in a region. If a point of interest is detected, closer scrutiny in the direction of the point of interest may be required. With many prior-art antennas, it is difficult or impossible to continue monitoring in other directions in a way that can be interleaved with closer scrutiny in a particular direction.

Suppose, for sake of discussion, that some point of interest is detected within the field of view (FOV) of an antenna, defined, for example, by a direction from which there is a return signal. It might be desirable to dither the aim of the antenna, meaning to change the aim of the antenna slightly in each of several directions, to see whether the strength of the return signal increases or diminishes. The goal is, of course, to identify the specific direction in which the signal is the strongest. With a parabolic reflector antenna, such dithering requires physical movement of the antenna and so takes some time to settle. With a phased-array antenna, such dithering does not require physical movement of the antenna, but nonetheless takes some time.

Every high-gain antenna, no matter how cleverly designed and no matter how carefully manufactured, generates side lobes. For an antenna that is transmitting, by "side lobes" is meant that while most of the RF energy propagates in some particular direction (the intended direction of high gain), some of the energy also propagates in other directions. For an antenna that is receiving, by "side lobes" is meant that the antenna picks up RF energy not only from the direction of high gain but also, to some extent, from other directions.

SUMMARY

It would be very helpful if a high-gain antenna could be devised which would be capable of being re-aimed in a time interval of 100 nanoseconds or less, this time being a fraction of the time a radar generally "looks" in any one direction. It would be helpful if approaches for use of such an antenna could be devised that would reduce the effect of side lobes. It would be helpful if approaches for use of such an antenna could be devised that would permit very fast dithering. It would be helpful if approaches could be devised permitting interleaving of monitoring in other directions with closer scrutiny in a particular direction.

An antenna is comprised of an array of antenna elements, groups of antenna elements adjustably coupled to respective common reference signal (reference wave). A multiplicity of patterns of antenna coupling settings are defined, each of which gives rise to a main lobe which points the antenna in a particular direction, each pattern also giving rise to respective side lobes. First and second such patterns may point the antenna in the same direction but with non-identical side lobes. The first and second patterns may be used in quick succession, the first for transmitting and the second for receiving. In this way the magnitude of the side lobes relative to the main lobe is much smaller than would be the case if one of the patterns were employed both for transmitting and receiving. Alternatively, the first and second patterns may be used in quick succession both for transmitting, or used in quick succession both for receiving. The antenna may also switch rapidly between patterns where the main lobe points in a different direction in each pattern, allowing dithering of the beam or rapid switching between scanning and tracking.

DETAILED DESCRIPTION

Figure 2:
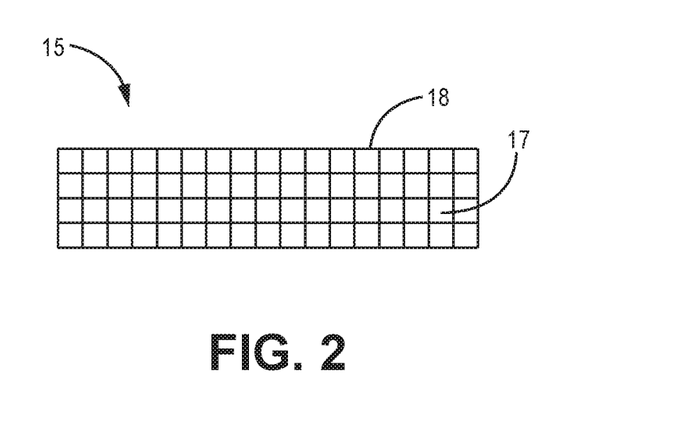
FIG. 2 shows an array of antenna elements of an antenna, according to an embodiment.

Turning first to FIG. 2, what is shown is an array 18 of antenna elements 17 of an antenna 15, according to an embodiment. The antenna elements 17 are coupled to one or more reference waves, omitted for clarity in FIG. 2. Each reference wave travels in a wave-propagating structure, which has a feed point connected to a network passing RF energy to and/or from the antenna, the feed point and network omitted for clarity in FIG. 2.

Figure 4:
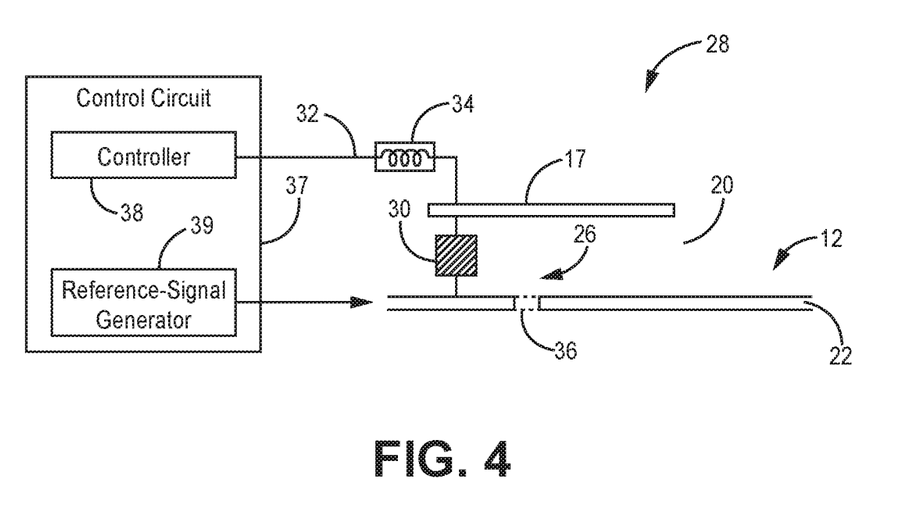
FIG. 4 is a side view and an electrical diagram of an antenna system including a control circuit and an antenna unit of an antenna, the antenna unit including an antenna element and a switching circuit for adjustably coupling a reference wave to the antenna element, according to an embodiment.

FIG. 4 is a side view and electrical diagram of the antenna unit 28 of the antenna 15 of FIG. 2, a portion of a conductive strip 22 of a transmission medium 12 corresponding to the antenna unit, and a control circuit 37 configured to control the antenna unit. Examples of the transmission medium 12 include a transmission line and a waveguide. Furthermore, the control circuit 37 can be, or can include a microprocessor circuit or a microcontroller circuit configurable with program instructions, a circuit (e.g., field-programmable gate array (FPGA)) configurable with firmware or another stream of data, an application-specific circuit, or a combination or subcombination of such circuits.

A coupling region 26 can be modeled as a lumped adjustable-impedance element 30, which is electrically coupled between the conductive strip 22 and the antenna element 17. A conductive control line 32 is directly coupled to the lumped element 30, or is indirectly coupled to the lumped element via the conductive antenna element 17 as shown. As described below, a controller 38 of the control circuit 37 is configured to selectively couple and uncouple, to and from the antenna element 17, a reference signal generated by a reference-signal generator 39 of the control circuit and propagating along the transmission medium 12. Therefore, the controller 38 can selectively activate and deactivate the antenna element 17 by generating a bias signal on the control line 32, and by selectively changing a level of the bias signal (e.g., a bias voltage) on the control line. Furthermore, a low-pass filter 34 can be serially coupled between the lumped element 30 and the controller 38 to uncouple, from the controller, high-frequency energy from the signal propagating along the transmission medium 12. The reference signal can have a wavelength and frequency in the respective bands typically reserved for radar applications.

And the portion of the conductive strip 22 corresponding to the antenna unit 28 includes a gap 36, which can be filled with the same material that forms a coupling layer 20, and which is configured to couple the signal propagating along the transmission medium 12 to the antenna unit.

Still referring to FIG. 4, during operation of the antenna unit 28 in a transmit mode, in response to the control signal on the control line 32 having a level that inactivates the lumped element 30, the coupling region 26 presents a large impedance to the gap 36, and thus blocks the reference signal propagating along the transmission medium 12 from coupling to, and exciting, the antenna element 17. Therefore, the antenna element 17 radiates little or no energy.

In contrast, in response to the control signal on the control line 32 having a level that activates the lumped element 30, the coupling region 26 presents a small impedance to the gap 36, and thus couples the signal propagating along the transmission medium 12 to the antenna element 17 such that the signal excites the antenna element. Therefore, the excited antenna element 17 radiates energy at the same frequency or frequencies as the frequency or frequencies of the reference signal propagating along the transmission medium 12. For example, when the lumped element 30 is active, the coupling region 26 is configured to form, together with the antenna element 17, a series-resonant circuit having a resonant frequency of approximately $f_0$. As known, at its resonant frequency, a series-resonant circuit has a low impedance, ideally zero impedance. Because the signal propagating along the transmission medium 12 has a frequency (or frequencies) of approximately $f_0$, the region 26, when the lumped element 30 is active, presents a low impedance to the signal. To implement such a selectively resonant circuit, the lumped element 30 can be, or can include, a semiconductor device, such as a field-effect transistor (FET) or other device that, when activated, alters the impedance of the coupling region 26 such that the coupling region forms, at $f_0$, a series-resonant circuit with the antenna element 17, or between the conductive strip 22 and the antenna element.

During operation of the antenna unit 28 in a receive mode, in response to the control signal on the control line 32 having a level that inactivates the lumped element 30, the coupling region 26 presents a large impedance to the gap 36, and thus blocks a signal (e.g., from a source remote from the antenna that includes the element 17) incident on the element 17 from the transmission medium 12. Therefore, little or no energy received by the antenna element 17 is coupled to the transmission medium 12, or to a receiver circuit that can form part of the control circuit 37.

In contrast, in response to the control signal on the control line 32 having a level that activates the lumped element 30, the coupling region 26 presents a small impedance to the gap 36, and thus couples the signal incident on the antenna element 17 to the transmission medium 12 such that the received signal propagates along the transmission medium to the control circuit 37. Therefore, the antenna element 17 couples to the transmission medium 12 energy at the same frequency or frequencies as the frequency or frequencies of the signal incident on the antenna element. For example, when the lumped element 30 is active, the coupling region 26 is configured to form, together with the antenna element 17, a series-resonant circuit having a resonant frequency of approximately $f_0$. As known, at its resonant frequency, a series-resonant circuit has a low impedance, ideally zero impedance. Because the signal incident on the antenna element 17 has a frequency (or frequencies) of approximately $f_0$, the region 26, when the lumped element 30 is active, presents a low impedance to the signal. To implement such a selectively resonant circuit, the lumped element 30 can be, or can include, a semiconductor device, such as a field-effect transistor (FET) or other device that, when activated, alters the impedance of the coupling region 26 such that the coupling region forms, at $f_0$, a series-resonant circuit with the antenna element 17, or between the conductive strip 22 and the antenna element.

Still referring to FIGS. 2 and 4, although only one antenna unit 28 is described, all of the other antenna units 28 of the antenna 15 can have the same structure, and operate in the same manner, as the described antenna unit 28.

Further details of the antenna 15 and the antenna units 28 can be found in U.S. patent application Ser. No. 14/506,432, titled Surface Scattering Antennas With Lumped Elements, which was filed on 3 Oct. 2014, and which is incorporated by reference herein.

Still referring to FIG. 4, in another embodiment, a switching circuit is configured to adjustably couple an antenna element 17 with the transmission medium 12. In this exemplary switching circuit, the control circuit 37 is configured to send digital signals to an array of FET switches at each of the antenna-element sites. At each element site, the FET switch acts as an RF coupling circuit. In this way, the antenna element 17 may sometimes be coupled with the transmission medium 12 and at other times will not be coupled with the transmission medium.

Still referring to FIG. 4, it will be appreciated that the switching time for such a coupling circuit can be as fast as 50 nanoseconds, and may be as fast as 25 nanoseconds, or even as fast as 14 nanoseconds. Therefore, such a coupling circuit (e.g., the coupling structure described above in conjunction with FIG. 4 or the above-described switching circuit) permits re-aiming the antenna from one point in space to a different point in space very quickly, for example, on the order of tens of nanoseconds.

By comparison, a legacy phased-array antenna might take as long as hundreds of microseconds to be re-aimed from one point in space to a different point in space. And by comparison, a parabolic reflector antenna might take hundreds of milliseconds (or far longer) to be re-aimed and to stabilize at the newly aimed direction.

In an exemplary embodiment, each antenna element 17 is controlled with one bit per element, that is, the element is either strongly coupled with the transmission medium 12 or is weakly coupled, or completely uncoupled, with the transmission medium. It will be appreciated, however, that with a suitable coupling circuit, the control may be more than one bit per element. With more than one bit per element, the coupling can be an adjustable complex coupling with an amplitude selected according to the control bits. In this context, the term "adjustably coupled" is intended to encompass not only one bit per antenna element, but more than one bit per antenna element.

Reduction of undesired effects of side lobes. As will be discussed below in greater detail, with the antenna of FIG. 2, a multiplicity of patterns of antenna coupling settings are defined, each of which gives rise to a main lobe which points the antenna in a particular direction, each pattern also giving rise to respective side lobes.

Figure 1:
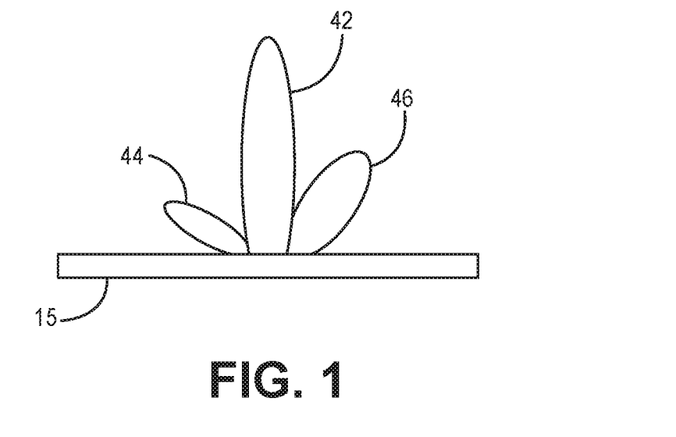
FIG. 1 shows a first beam pattern emitted by an antenna, according to an embodiment.

First and second such patterns may point the antenna in the same direction but with non-identical side lobes. FIG. 1 shows a first beam pattern emitted by an antenna 15 according to an embodiment, at a time when a first particular pattern of antenna-element couplings is in effect. The beam pattern has a main lobe 42 and side lobes 44 and 46. FIG. 1 shows only one degree of freedom, namely angle of propagation within a particular plane. It will be appreciated that the more or less planar antenna 15 actually propagates RF energy into space with two degrees of freedom, thus permitting propagation into a volume of space. In an exemplary embodiment, the antenna 15 has a broad field of view, namely ±50 degrees in azimuth (AZ) and ±45 degrees in elevation (EL). Thus an actual beam pattern will have lobes in any of two different degrees of freedom relative to a main lobe.

Figure 3:
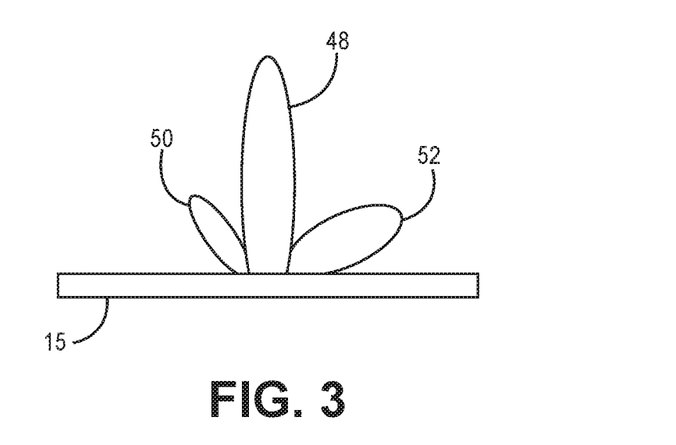
FIG. 3 shows a second beam pattern emitted by an antenna, according to an embodiment.

FIG. 3 shows a second beam pattern emitted by the antenna 15 according to an embodiment, at a time when a second particular pattern of antenna element couplings is in effect. The beam pattern has a main lobe 48 and side lobes 50, 52. As with FIG. 1, it is understood that the portrayal of FIG. 3 shows just angles of propagation within a particular plane.

The first pattern of FIG. 1 and the second pattern of FIG. 2 may be used in quick succession, for example, the first for transmitting and the second for receiving. Consider the side-lobe consequence of this approach. At a transmit time, side-lobe RF energy propagates into space in the directions of lobes 44, 46 (FIG. 1). Soon afterwards, at a receive time, the side-lobe sensitivity of the antenna is in the directions of lobes 50, 52 (FIG. 3). If some transmit energy due to lobes 44, 46 were to be reflected back to the antenna 15 from some point in the field of view, this reflected energy is not particularly well coupled with the receive lobes 50, 52. In this way, the clutter from the side lobes relative to the signal level from the main lobe is much smaller than would be the case if a single one of the patterns were employed both for transmitting and receiving.

One way to model the reduction of side-lobe clutter due to this approach is to express one or more of side lobes 44, 46 (FIG. 1) as a first vector and to express one or more of side lobes 50, 52 as a second vector, and to take the dot product of the two vectors. To the extent that the side lobes 44, 46 are approximately orthogonal to the side lobes 50, 52, respectively, the dot products will be small, or zero, and thus the clutter contribution of side lobes to the signal of the main lobe will be small. Furthermore, such orthogonality need not be in plane of FIG. 1 or in the plane of FIG. 3, but can be in any other plane or planes that intersect the longitudinal axes of the respective pairs of the side lobes.

In a radar scanning and imaging application, a typical approach would thus be to configure the antenna 15 (FIGS. 1 and 3) with a first antenna-element pattern (e.g., the pattern of FIG. 1) and to emit an RF signal into space. Then the antenna 40 would be configured with a second antenna-element pattern (e.g., the pattern of FIG. 3), this second pattern selected because it has a substantially identical main lobe 48 as that of the first pattern, but has non-identical side lobes 50 and 52 as compared with the first pattern. (As mentioned above, it would be particularly fortunate if a second pattern could be found having nearly orthogonal side lobes relative to the first pattern, but embodiments offer benefits even if the side lobes of the second pattern are merely different in direction, even if not orthogonal, than the respective side lobes of the first pattern.) The antenna 15 having been configured with the second pattern, the RF circuitry is switched from transmit mode to receive mode, and the system "listens" for any echo from the field of view. The antenna 15 could also simultaneously use a first pattern for transmitting and a second pattern for receiving when operating in frequency modulated continuous wave (FMCW) mode.

In a radar-scanning-and-imaging application, the field of view may be divided into pixels, each of which roughly corresponds to the beam width of a main lobe as discussed above. For a first pixel, two antenna element patterns are defined as described above and are used for transmitting and receiving with respect to that pixel. Next a second pixel is selected, and two antenna element patterns are employed which have main lobes in the direction of that second pixel and different (e.g., orthogonal) side-lobe patterns as described above. This process is repeated for all of the pixels in the field of view. In this way the field of view is imaged with a side-lobe clutter contribution that is smaller than would otherwise be the case.

Another way to make use of an antenna according to an embodiment is to use first and second patterns as described above in quick succession, both for transmitting. RF energy will thus have been propagated into space in a way that lets the main lobes of the two patterns reinforce each other, while the side lobes of the two patterns send RF energy in non-identical directions. The antenna system may then be switched into receive mode, and reflected energy may be detected.

Still another way to make use of an antenna according to an embodiment is to use first and second patterns as described above in quick succession, both for receiving. In receive mode, the antenna system detects received RF energy such that the main lobes of the two patterns reinforce each other, while the side lobes of the two patterns receive RF energy from non-identical directions. The antenna might serve as a passive receiver in which a side-lobe clutter contribution is smaller than would otherwise be the case.

Still another way to make use of an antenna according to an embodiment is to simultaneously transmit and detect reflected energy when operating in FMCW mode. In an example of the FMCW mode application, the antenna-element pattern for a given pixel of illumination would change at specific (aperiodic) intervals during a simultaneous transmit-receive operation. This would allow, through integration over a series of sequential or non-sequential signals, energy from the target (main beam direction) to add constructively while energy from clutter would add destructively.

It will thus be appreciated that what has been described are embodiments of methods for use with an antenna 15 comprising an array of antenna elements 17, the antenna for use at a frequency band having a free-space wavelength, the antenna elements spaced more closely together than the free-space wavelength (e.g., each antenna element is spaced apart from its closest neighbor antenna elements by no more than ½ of the free-space wavelength). The antenna elements 17 are adjustably coupled with one or more feed points with one or more reference waves via the transmission medium 12. The antenna 15 is employed with respect to a multiplicity of radiating and receiving patterns, each pattern defining coupling states of the antenna elements 17. As a first step, the antenna 15 is employed with respect to a first pattern yielding a main lobe 42 in a particular direction and yielding a smaller lobe 44 in a first direction differing from the particular direction, the main lobe 42 and smaller lobe 44 in the first direction defining a first ratio of main-lobe-to-side-lobe magnitude, thus yielding a first result. As a second step, the antenna 15 is employed with respect to a second pattern yielding a main lobe 48 in the particular direction and yielding a smaller lobe 50 in a second direction differing from the particular direction and differing from the first direction, the main lobe 48 and smaller lobe 50 in the second direction defining a second ratio of main-lobe-to-side-lobe magnitude, thus yielding a second result. Stated differently, smaller lobe 44 points in a different direction than smaller lobe 50. The first result and the second result are combined, yielding a combined result. This combining is inherently carried out by the different patterns effectively multiplying the first result and the second result. It is intended that the combined result will have a ratio of main-lobe-to-side-lobe magnitude more favorable than either the first ratio of main-lobe-to-side-lobe magnitude or the second ratio of main-lobe-to-side-lobe magnitude.

The step of employing the antenna 15 with respect to the first pattern may yield not only the smaller lobe 44 in the first direction, but also may yield a smaller lobe 46 in another direction differing from the direction of the main lobe or other smaller lobes. The first ratio of main-lobe-to-side-lobe magnitude may thus be defined with respect not only to the main lobe and the smaller lobe in the first direction, but also with respect to other smaller lobes in other directions.

Likewise the step of employing the antenna 15 with respect to the second pattern may yield not only the smaller lobe 50 in the second direction, but also may yield a smaller lobe 52 in another direction differing from the direction of the main lobe or other smaller lobes. The first ratio of main-lobe-to-side-lobe magnitude may thus be defined with respect not only to the main lobe and the smaller lobe in the second direction, but also with respect to other smaller lobes in other directions.

Transmit and receive. One use case for the sequential use of a first pattern and a second pattern is to transmit and then receive. In this use case, the first employing step comprises transmitting radio-frequency energy, and the second employing step comprises receiving radio-frequency energy.

A related use case is a case in which the first employing step comprises transmitting radio-frequency energy and receiving radio-frequency energy, and the second employing step comprises transmitting radio-frequency energy and receiving radio-frequency energy.

Passive receiver use case. In another use case, the antenna system is employed as a passive receiver. In such a case, a point in the field of view is interrogated using a first pattern and is then interrogated using a second pattern, thus minimizing the side-lobe contributions to the received signal as compared with the main-lobe contributions to the received signal.

Dithering. When an antenna system picks up a signal (for example a reflected signal), this event does not necessarily mean that the main lobe of the antenna is pointed directly at the point in space that has given rise to the picked-up signal. It will often be desirable to "dither" the beam by small angular movements in two degrees of freedom, for example AZ and EL. The goal of the dithering is to work out the particular AZ angle and particular EL angle yielding the strongest picked-up signal. The dither will typically represent excursions with small plus and minus angular movements in two degrees of freedom, collecting signal-strength values for at least four, and perhaps six or eight, points in space surrounding the point in space from which the picked-up signal was received.

With many legacy phased-array antenna designs, the re-aiming of an antenna for purposes of dithering takes hundreds of nanoseconds or even a microsecond or longer. A dither with, say, four excursions would consume some microseconds or more of re-aiming time. A parabolic reflector antenna could consume a second or more to carry out a dither with four excursions.

With the antenna system as described herein, the re-aiming time of the antenna is only some tens of nanoseconds, so that a dither with four excursions would only consume some tens or a few hundreds of nanoseconds. In a Continuous Wave system, the ability to dither the main lobe very quickly enables the system to identify the velocity of an object of interest without the risk of track loss.

Scanning interleaved with scrutiny of a point of interest. As was mentioned above, in a scanning and imaging application, the field of view of an antenna system may be divided into a multiplicity of pixels. The antenna can be aimed toward each of the pixels one by one, permitting an image to be developed of the field of view.

The goal of the imaging is, of course, to discover points of interest within the field of view from which RF energy is received. The RF energy may be reflected energy (from a signal transmitted earlier from the antenna) or the antenna may be acting as a passive receiver. In any case, once a point of interest is discovered, it may be desired to interleave two activities, namely a more directed scrutiny of the point of interest as a first activity, and a continued scanning of the field of view as a second activity.

With many legacy antenna systems, such interleaved activity is simply not practical, and may even be impossible. The antenna system is not "agile" enough to jump back and forth between the antenna settings that make possible the scanning on the one hand, and the antenna settings that make possible close scrutiny of a particular point on the other hand. It is necessary with many such systems to pick one activity (scanning) or the other (scrutiny) but not both, to be carried out at a particular time.

With some other legacy antenna systems, there may be some limited extent to which some interleaving can be attempted. With such antenna systems, the time spent re-aiming the antenna is time during which no data collection can take place. At the very least, this gives rise to a loss of potential data collection bandwidth. With a legacy phased-array antenna, as mentioned above, the re-aiming time may be well over one microsecond.

As will now be described, given the fast re-aiming times available with the system described herein, such interleaving of scanning and scrutiny is not only possible, but can be carried out very efficiently, with little or no loss of data-collection bandwidth.

As for the dithering and as for the interleaved scanning and scrutiny, a common capability may be appreciated, namely the successful re-aiming of the antenna in just a few tens of nanoseconds rather than hundreds of nanoseconds or in excess of a microsecond for legacy antenna designs.

This common capability may be illustrated by a method for use with an antenna 15 comprising an array of antenna elements 17, the antenna for use at a frequency band having a free-space wavelength, the antenna elements 17 spaced more closely together than the free-space wavelength. The antenna elements 17 are adjustably coupled relative to one or more feed points. The antenna 15 is employed with respect to a multiplicity of patterns, each pattern defining coupling states of the antenna elements 17.

In such a method, the antenna 15 is configured according to the coupling states of the first pattern, and use is made of the antenna at a first time. The antenna 15 is then re-aimed, which means configuring the antenna according to the coupling states of the second pattern. Use is then made of the antenna at a second time. The re-aiming interval is no longer than 50 nanoseconds, and may be as short as 25 nanoseconds, and may be as short as 14 nanoseconds.

The use of the antenna at the first time may comprise receiving RF energy. The use of the antenna at the second time may also comprise receiving RF energy. The use of the antenna at the second time may constitute a dithering excursion relative to the use of the antenna at the first time. Alternatively the use of the antenna at the second time may constitute a scanning activity within the field of view and the use of the antenna at the first time may constitute scrutiny of a particular point in the field of view.

EXAMPLE 1

An example for use with an antenna comprising an array of antenna elements, the antenna for use at a frequency band having a free-space wavelength, the antenna elements spaced more closely together than half the free-space wavelength, the antenna elements adjustably coupled with one or more reference waves, the antenna employed with respect to a multiplicity of patterns, each pattern defining coupling states of the antenna elements, the method comprising the steps of:

employing the antenna with respect to a first pattern yielding a main lobe in a particular direction and yielding a smaller lobe in a first direction differing from the particular direction, the main lobe and smaller lobe in the first direction defining a first ratio of main-lobe-to-side-lobe magnitude, thus yielding a first result;

employing the antenna with respect to a second pattern yielding a main lobe in the particular direction and yielding a smaller lobe in a second direction differing from the particular direction and differing from the first direction, the main lobe and smaller lobe in the second direction defining a second ratio of main-lobe-to-side-lobe magnitude, thus yielding a second result;

combining the first result and the second result, yielding a combined result.

EXAMPLE 2

The example 1 further characterized in that the combined result has a ratio of main-lobe-to-side-lobe magnitude more favorable than either the first ratio of main-lobe-to-side-lobe magnitude or the second ratio of main-lobe-to-side-lobe magnitude.

EXAMPLE 3

The example 1 wherein the combining step comprises multiplying the first result and the second result.

EXAMPLE 4

The example 1 wherein:

the step of employing the antenna with respect to the first pattern yields not only the smaller lobe in the first direction, but also yields a smaller lobe in a third direction differing from the particular direction and differing from the first direction, the first ratio of main-lobe-to-side-lobe magnitude defined with respect not only to the main lobe and the smaller lobe in the first direction but also with respect to the smaller lobe in the third direction; and the step of employing the antenna with respect to the second pattern yields not only the smaller lobe in the second direction, but also yields a smaller lobe in a fourth direction differing from the particular direction and differing from the first direction and differing from the second direction and differing from the third direction, the first ratio of main-lobe-to-side-lobe magnitude defined with respect not only to the main lobe and the smaller lobe in the second direction but also with respect to the smaller lobe in the fourth direction.

EXAMPLE 5

The example 1 wherein:
the first employing step comprises transmitting radio-frequency energy, and
the second employing step comprises receiving radio-frequency energy.

EXAMPLE 6

The example 1 wherein:
the first employing step comprises transmitting radio-frequency energy and receiving radio-frequency energy, and
the second employing step comprises transmitting radio-frequency energy and receiving radio-frequency energy.

EXAMPLE 7

The example 1 wherein:
the first employing step comprises receiving radio-frequency energy, and
the second employing step comprises receiving radio-frequency energy.

EXAMPLE 8

A method for use with an antenna comprising an array of antenna elements, the antenna for use at a frequency band having a free-space wavelength, the antenna elements spaced more closely together than half the free-space wavelength, the antenna elements adjustably coupled relative to one or more reference waves, the antenna employed with respect to a multiplicity of patterns, each pattern defining coupling states of the antenna elements, the method comprising the steps of:
configuring the antenna according to the coupling states of the first pattern, and making use of the antenna at a first time; and
configuring the antenna according to the coupling states of the second pattern, and making use of the antenna at a second time, the second time coming after the first time, the second time defining a re-aiming interval between the first time and the second time;
the method further characterized in that the re-aiming interval is no longer than 250 nanoseconds.

EXAMPLE 9

The example 8 wherein the re-aiming interval is no longer than 100 nanoseconds.

EXAMPLE 10

The example 8 wherein the re-aiming interval is no longer than 50 nanoseconds.

EXAMPLE 11

The example 8 wherein the re-aiming interval is no longer than 25 nanoseconds.

EXAMPLE 12

The example 9 wherein the re-aiming interval is no longer than 14 nanoseconds.

EXAMPLE 13

The example 8 wherein the making use of the antenna at the first time comprises receiving RF energy.

EXAMPLE 14

The example 8 wherein the making use of the antenna at the second time comprises receiving RF energy.

EXAMPLE 15

The example 8 wherein the making use of the antenna at the second time comprises transmitting RF energy.

EXAMPLE 16

The example 8 wherein the making use of the antenna at the second time constitutes a dithering excursion relative to the making use of the antenna at the first time.

EXAMPLE 17

The example 8 wherein the antenna has a field of view, and wherein making use of the antenna at the second time constitutes a scanning activity within the field of view and the making use of the antenna at the first time constitutes scrutiny of a particular point in the field of view.

The alert reader will have no difficulty devising myriad variants and improvements upon the disclosed embodiments, without departing from the spirit and scope of the disclosure. For example, although the side lobes 44 and 50 are each described as emanating from approximately the same location (e.g., the center location) of the antenna 15 as the main lobes 42 and 48, respectively, the side lobes may emanate from an approximately same location that is different from the locations from which the main beams 42 and 48 emanate. A similar alternate embodiment applies to the side lobes 46 and 52. Furthermore, the main lobes 42 and 48 can emanate from respective locations other than approximately a center of the antenna 15, as can the side lobes 44, 46, 50, and 52. Furthermore, all such myriad variants and improvements are intended to be encompassed within the claims which follow.

The invention claimed is:
1. An antenna system, comprising:
an antenna having antenna elements; and
a control circuit configured
to activate a first group of the antenna elements during a first time to cause the antenna to generate a first beam pattern including a first main lobe having a main-lobe direction and having a main-lobe beam width and including a first side lobe having a first side-lobe direction, and
to activate a second group of the antenna elements during a second time to cause the antenna to generate a second beam pattern that is different from the first beam pattern, the second beam pattern including a second main lobe having approximately the main-lobe direction and having approximately the main-lobe beam width and including a second side lobe having a second side-lobe direction that is different from the first side-lobe direction.
2. The antenna system of claim 1 wherein:
the first main lobe emanates from a main-lobe location of the antenna;

the second main lobe approximately emanates from the main-lobe location;
the first side lobe emanates from a first side-lobe location of the antenna; and
the second side lobe approximately emanates from the first side-lobe location.

3. The antenna system of claim 2 wherein the control circuit is further configured:
to activate the first group of antenna elements during the first time to cause the antenna to generate the first beam pattern including a third side lobe having a third side-lobe direction and emanating from a second side-lobe location of the antenna; and
to activate the second group of antenna elements during the second time to cause the antenna to generate the second beam pattern including a fourth side lobe having a fourth side-lobe direction that is different from the third side-lobe direction and approximately emanating from the second side-lobe location.

4. The antenna system of claim 1 wherein the second side-lobe direction is approximately orthogonal to the first side-lobe direction.

5. The antenna system of claim 1, wherein the control circuit is further configured:
to deactivate the first group of the antenna elements before activating the second group of antenna elements; and
to activate the second group of the antenna elements such that the antenna generates the second beam pattern within 250 nanoseconds of the control circuit deactivating the first group of antenna elements.

6. The antenna system of claim 1 wherein:
the control circuit is configured to generate a reference signal having a wavelength and to couple the reference signal to the antenna; and
each antenna element is spaced apart from a closest other antenna element by a distance that is less than half of the wavelength.

7. The antenna system of claim 1 wherein the control circuit is configured:
to couple a reference signal to the antenna during one of the first time and the second time; and
to receive a signal from the antenna during the other of the first time and the second time.

8. The antenna system of claim 1 wherein the control circuit is configured to couple a reference signal to the antenna during the first time and during the second time.

9. The antenna system of claim 1 wherein the control circuit is configured to receive a signal from the antenna during the first time and during the second time.

10. The antenna system of claim 1 wherein:
the antenna includes a transmission medium having a conductor with gaps respectively adjacent to the antenna elements; and
the control circuit is configure
to generate a reference signal,
to couple the reference signal to the transmission medium, to activate the first group of the antenna elements by reducing a respective
impedance between each antenna element in the first group and a respective one of the gaps; and
to activate the second group of the antenna elements by reducing a respective impedance between each antenna element in the second group and a respective one of the gaps.

11. A method, comprising:
activating a first group of antenna elements of an antenna to generate a first beam pattern including a first main lobe having a main-lobe direction and having a main-lobe beam width and including a first side lobe having a first side-lobe direction; and
activating a second group of antenna elements of the antenna to generate a second beam pattern that is different from the first beam pattern, the second beam pattern including a second main lobe having approximately the main-lobe direction and having approximately the main-lobe beam width and including a second side lobe having a second side-lobe direction that is different from the first side-lobe direction.

12. The method of claim 11 wherein:
the first main lobe emanates from a main-lobe location of the antenna;
the second main lobe emanates from approximately the main-lobe location;
the first side lobe emanates from a first side-lobe location of the antenna; and
the second side lobe emanates from approximately the first side-lobe location.

13. The method of claim 11 wherein:
the first main lobe emanates from a location of the antenna;
the second main lobe emanates from approximately the location;
the first side lobe emanates from approximately the location; and
the second side lobe emanates from approximately the location.

14. The method of claim 11 wherein:
activating the first group of antenna elements includes activating the first group of antenna elements of the antenna to generate the first beam pattern including a third side lobe having a third side-lobe direction and emanating from a second side-lobe location of the antenna; and
activating the second group of antenna elements includes activating the second group of antenna elements of the antenna to generate the second beam pattern including a fourth side lobe having a fourth side-lobe direction that is different from the third side-lobe direction and emanating from approximately the second side-lobe location.

15. The method of claim 11 wherein the second side-lobe direction is approximately perpendicular to the first side-lobe direction.

16. The method of claim 11, further comprising:
deactivating antenna elements that are members of the first group but not members of the second group before activating the second group of antenna elements; and
generating the second beam pattern with the second group of antenna elements within 250 nanoseconds of deactivating the antenna elements that are members of the first group but are not members of the second group.

17. The method of claim 11, further comprising:
generating a reference wave;
wherein activating the first group of antenna elements includes simultaneously coupling the reference wave to each of the antenna elements in the first group; and
wherein activating the second group of antenna elements includes simultaneously coupling the reference wave to each of the antenna elements in the second group.

18. The method of claim 11 wherein:

wherein activating the first group of antenna elements includes simultaneously coupling each of the antenna elements in the first group to a transmission medium; and wherein activating the second group of antenna elements includes simultaneously coupling each of the antenna elements in the second group to the transmission medium.

19. The method of claim 11, further comprising:

generating a reference wave;

wherein activating the first group of antenna elements includes simultaneously coupling the reference wave to each of the antenna elements in the first group; and wherein activating the second group of antenna elements includes simultaneously coupling each of the antenna elements in the second group to a transmission medium while a wave from a source remote from the antenna is incident on the antenna elements of the second group.

20. The method of claim 11, further comprising:

generating a reference wave;

wherein activating the first group of antenna elements includes simultaneously coupling each of the antenna elements in the first group to a transmission medium while a wave from a source remote from the antenna is incident on the antenna elements of the first group; and wherein activating the second group of antenna elements includes simultaneously coupling the reference wave to each of the antenna elements in the second group.

21. The method of claim 11 wherein:

activating the first group of antenna elements includes coupling each of the antenna elements of the first group to a respective gap in a conductor of a transmission medium; and activating the second group of antenna elements includes coupling each of the antenna elements of the second group to a respective gap in the conductor.

22. A tangible, non-transitory computer-readable medium storing instructions, that when executed by at least one computing circuit, cause the at least one computing circuit, or at least one other circuit under control of the at least one computing circuit:

to activate a first group of antenna elements of an antenna to generate a first beam pattern including a first main lobe having a main-lobe direction and having a main-lobe beam width and including a first side lobe having a first side-lobe direction; and to activate a second group of antenna elements of the antenna to generate a second beam pattern that is different from the first beam pattern, the second beam pattern including a second main lobe having approximately the main-lobe direction and having approximately the main-lobe beam width and including a second side lobe having a second side-lobe direction that is different from the first side-lobe direction.

23. The method of claim 11 wherein the second group of antenna elements is different from the first group of antenna elements.

24. The tangible, non-transitory computer-readable medium of claim 22 wherein the second group of antenna elements is different from the first group of antenna elements.

* * * * *

UNITED STATES PATENT AND TRADEMARK OFFICE
CERTIFICATE OF CORRECTION

PATENT NO. : 10,601,130 B2
APPLICATION NO. : 15/655505
DATED : March 24, 2020
INVENTOR(S) : Tom Driscoll et al.

Page 1 of 1

It is certified that error appears in the above-identified patent and that said Letters Patent is hereby corrected as shown below:

In the Claims

At Column 13, Claim 10, Line 57, please replace "the control circuit is configure" with --the control circuit is configured--

Signed and Sealed this
Sixteenth Day of June, 2020

Andrei Iancu
*Director of the United States Patent and Trademark Office*